United States Patent [19]
Dumazet

[11] 3,871,458
[45] Mar. 18, 1975

[54] DEVICE FOR SUPPRESSING THE IGNITION OR EXPLOSION OF ESCAPING COMBUSTIBLE GASES UNDER HIGH PRESSURE

[75] Inventor: Eugene Dumazet, Ste Catherine-les-Arras, France

[73] Assignee: Societe Ethylene Plastique, Courbevoie, France

[22] Filed: Dec. 8, 1972

[21] Appl. No.: 313,420

[30] Foreign Application Priority Data
Dec. 14, 1971   France .................. 71.4490

[52] U.S. Cl. .................. 169/45, 169/56, 169/5, 239/365
[51] Int. Cl. ............................. A62c 3/00
[58] Field of Search ........ 169/2 R, 4, 56, 5; 220/88, 220/89; 239/310, 317, 318, 364–368; 137/205.5

[56] References Cited
UNITED STATES PATENTS

| | | |
|---|---|---|
| 1,568,536 | 1/1926 | Schwab .......................... 239/365 X |
| 2,317,836 | 4/1943 | Weaver ................................ 169/4 |
| 2,706,005 | 4/1955 | Zingler ............................ 239/364 X |
| 3,017,118 | 1/1962 | Kane ............................. 239/365 X |
| 3,132,806 | 5/1964 | McNair et al .................. 239/366 X |
| 3,165,114 | 1/1965 | Garrett .......................... 239/317 X |
| 3,704,811 | 12/1972 | Harden ................................ 222/4 |

*Primary Examiner*—Robert S. Ward, Jr.
*Assistant Examiner*—John J. Love
*Attorney, Agent, or Firm*—Jacobs and Jacobs

[57] ABSTRACT

The device comprises a duct to receive combustible gas, escaping under pressure from a container, which comprises a duct to receive said gas, a venturi in said duct, a reservoir for a combustion-suppressing fluid connected to the said duct both upstream of and at the said venturi, in relation to the gas flow, in such a way that the pressure differential produced by the passage of the gas through the venturi forces fluid out of the said reservoir into the path of the said gas in the said duct.

5 Claims, 1 Drawing Figure

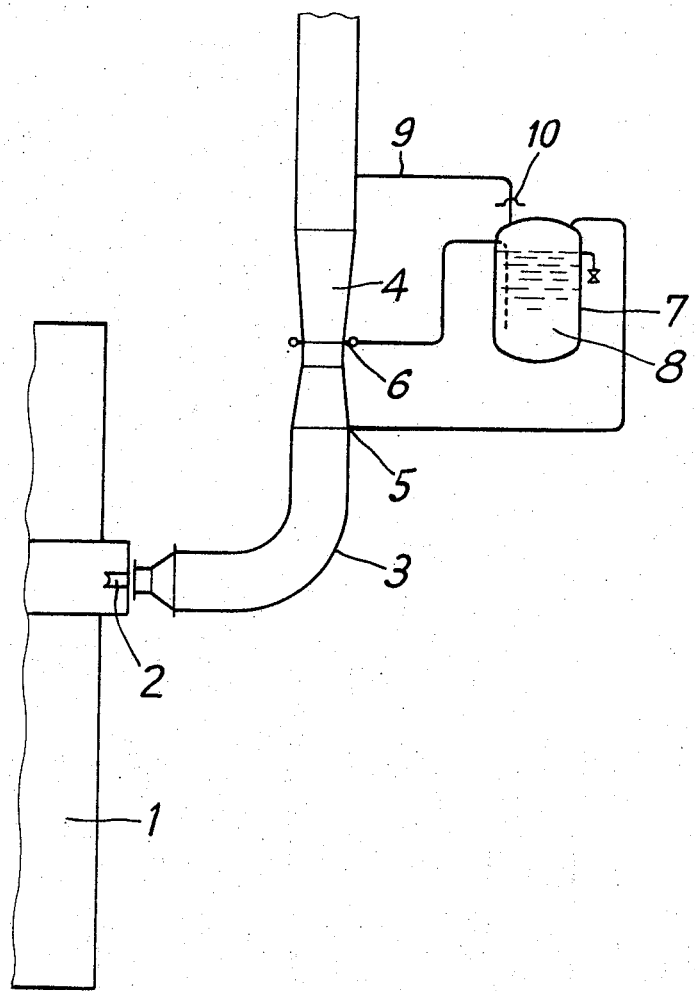

DEVICE FOR SUPPRESSING THE IGNITION OR EXPLOSION OF ESCAPING COMBUSTIBLE GASES UNDER HIGH PRESSURE

The present invention provides a device for suppressing the ignition or explosion of combustible gases escaping from containers under high pressure.

Some chemical reactions involve the use of gases under high pressure. This is the case, for example, in the high pressure polymerisation of ethylene. Now, in such reactions, it is sometimes necessary to vent the reagents to the atmosphere (or to arrange that an uncontrolled pressure rise shall lead to spontaneous venting), and, if at least one of the reagents is combustible, this venting often leads to ignition or explosion of the mixture of reagents in the air.

The subject of the invention is a device which prevents the said explosion.

The device of the invention, which is placed in the outlet path of the valve through which the combustible gas is vented, comprises a venturi, placed in the path of the gas, the said venturi being connected to a reservoir of fluid in a way such as to cause the said fluid to be injected into the combustible gas as the said gas is passing through the venturi. Thus the device may comprise a duct to receive the vented combustible gas, a venturi in said duct, a reservoir for a combustion-suppressing fluid connected to the said duct both upstream of and at the said venturi, in relation to the gas flow, in such a way that the pressure differential produced by the passage of the gas through the venturi forces fluid out of the said reservoir into the path of the said gas in the said duct. Valves, taps, or other pressure controllers may be provided in the connections from the reservoir to the duct to control the flow of fluid from the reservoir into the duct.

The fluid which is injected into the stream of combustible gas can be a liquid or a gas, whichever is desired. Thus, it can be water either as a liquid which is sprayed into the stream of gas, or as vapour. The fluid can also be a stream of an auxiliary gas having a powder suspended therein. The injection of the fluid into the combustible gas causes, first, a cooling of the gas, and secondly, a change in the explosive properties of the mixture produced.

A schematic representation of a device in accordance with the invention is shown in the accompanying drawing. In this drawing the high pressure reactor 1 containing the combustible gas has a safety valve or bursting disc 2 which, under certain predetermined conditions, vents the gas contained in the reactor. The tube 3 conveys the gas from the reactor 1 to the venturi 4. It has two pressure regulating valves 5 and 6, one 5 upstream from and the other 6 at the venturi. The injection of the fluid into the venturi takes place through the valve 6. When the fluid is a liquid it may be injected from a reservoir 7 containing a fluid 8.

The pressure above the fluid 8 and hence the rate of injection of the fluid through valve 6 is controlled by the valve 5. The reservoir 7 is connected to the tube through which the gases pass by a pipe 9 as well as to the pressure valves 5 and 6 of the venturi. A valve (or bursting disc) 10 is placed in the pipe 9 at the outlet of the reservoir 7 to act as a safety valve for the latter.

The manner of functioning of the device is obvious from its construction.

I claim:

1. A device for suppressing the ignition or explosion of a combustible gas escaping under pressure from a high pressure ethylene polymerization reactor, which comprises a pressure-relief valve for venting combustible gas under pressure from said reactor, a duct connected to said pressure-relief valve to receive said combustible gas, a venturi in said duct, a reservoir for a combustion-suppressing fluid, and conduit means for connecting the venturi to the said duct both upstream of and at the divergent section of said venturi, in relation of the gas flow, in such a way that the pressure differential produced by the passage of the gas through the venturi forces fluid out of the said reservoir into the path of the said gas in the said duct.

2. A device according to claim 1 in which valves are provided in the connections from the reservoir to the duct upstream of and at the venturi to control the flow of the fluid from the reservoir into the said duct.

3. A device according to claim 1 in which the reservoir is also provided with a pressure-relief valve venting into the said duct downstream of the venturi.

4. A device according to claim 1 in which the reservoir contains water as the fluid.

5. A method of suppressing the ignition or explosion of a combustible gas escaping under pressure from a container which comprises placing a device as defined in claim 1 in the path of said gas and causing or allowing the compression-suppressing fluid to flow into the path of the said gas under the pressure differential produced by the passage of the said gas through the venturi.

* * * * *

UNITED STATES PATENT OFFICE
CERTIFICATE OF CORRECTION

Patent No. 3,871,458     Dated March 18, 1975

Inventor(s) Eugene Dumazet

It is certified that error appears in the above-identified patent and that said Letters Patent are hereby corrected as shown below:

Change the priority claim to:

-- Claims priority from French Patent Application 71 44,940, filed December 14, 1971 in France --

Signed and Sealed this twenty-sixth Day of August 1975

[SEAL]

Attest:

RUTH C. MASON
*Attesting Officer*

C. MARSHALL DANN
*Commissioner of Patents and Trademarks*